Figure 1:
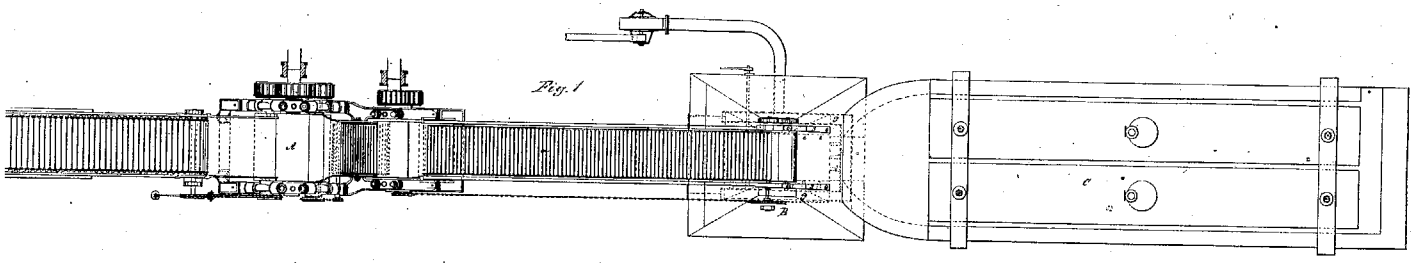
Figure 2:
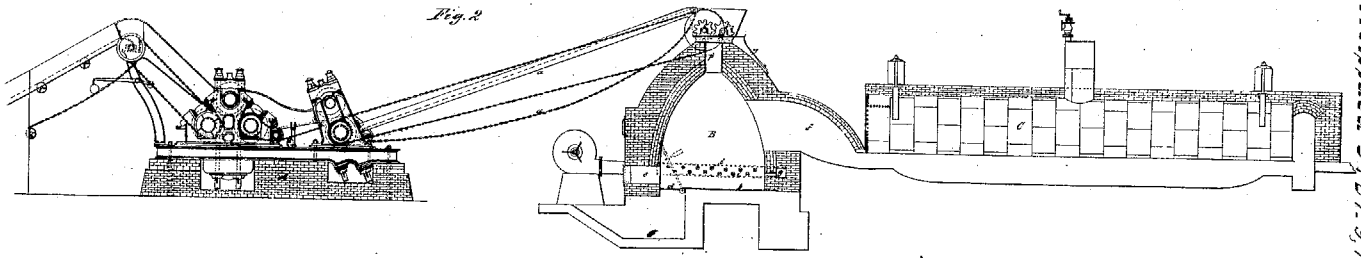

A. Stillman.

Steam-Boiler Furnace.

No 619.

Reissued Nov. 9, 1858.

N. PETERS, PHOTO-LITHOGRAPHER, WASHINGTON, D. C.

UNITED STATES PATENT OFFICE.

ELIZABETH ANN HARRIS, OF NEW YORK, N. Y., ADMINISTRATRIX OF ALFRED STILLMAN, DECEASED.

IMPROVED FURNACE FOR BURNING BAGASSE.

Specification forming part of Letters Patent No. 12,807, dated May 1, 1855; Reissue No. 619, dated November 9, 1858.

*To all whom it may concern:*

Be it known that ALFRED STILLMAN, late of the city, county, and State of New York, deceased, did invent certain new and useful Improvements in Employing Bagasse as Fuel in Sugar-Works; and I, ELIZABETH ANN HARRIS, (late Elizabeth Ann Stillman,) administratrix of the goods and estate of the said decedent,) do hereby declare that the following is a full, clear, and exact description of his said invention and of the operation thereof, reference being made to the annexed drawings, making a part of this specification, in which—

Figure I is a top or plan view. Fig. II is a side elevation, partly in section; and similar letters indicate similar parts in both the figures.

This invention consists in an improved method of constructing and operating a plantation sugar-works, whereby the refuse cane or bagasse may be at once utilized as fuel without requiring to be handled, dried, or otherwise prepared, and may also be consumed as fast as it is deprived of its saccharine juice.

From the commencement of the manufacture of sugar in this country attempts have been repeatedly made so to accomplish the burning of the refuse cane, while yet fresh from the rollers, as to render it available as fuel. In fact, to have been able merely to get rid of it from the plantation without expense would have been deemed a matter of great advantage, and yet up to the date of my invention even that had not been accomplished.

In order to obtain the full value of the cane-trash as fuel it must be burned as soon as it comes from the rollers, for if left to stand but a very short time it undergoes an acetous fermentation which deprives it by conversion, as is well known, of some of the elements of value for that purpose. To be thus burned while green requires a furnace which shall be capable of receiving the bagasse as fast as it is brought, substantially in the condition in which the said bagasse left the rolls, and also of preparing it for combustion by the action of that which is already in a state of combustion.

The furnace herein described as invented for the purpose performs the operation perfectly. It consists of a dome-shaped or arched chamber of great capacity as compared with a furnace for generating the same amount of heat by the burning of wood, having a hearth below with proper means for admitting air or a blast, and having also an opening at the top to receive the bagasse as well as a place of discharge whereby the products of combustion can pass beneath the steam-boilers, or to some other place where the heat is to be used. In order also that the works shall be self-operating as to this part, the opening of the furnace must be capable of taking in the bagasse automatically, and of being constantly closed up to the entering mass.

The cane-mill represented at A in the annexed drawings is after the plan known as "Stillman's Patent," although any other kind of mill may be employed. From the last pair of rollers, or where the cane has received the final compression and is ready to be discharged, an endless carrier is so arranged as to receive the cane-trash and convey it to the furnace in the order and as fast as delivered by the rollers, said carrier being represented at A′. This carrier terminates over the top of the furnace, and there the begasse is received by a peculiar feeding apparatus, which discharges it into the furnace, and yet keeps the aperture closed, and is thus constructed. At O O are two rollers, situated, as shown, immediately over the square aperture P, leading down into the furnace. One of these rollers has its boxes so made that the roller may play back and forth horizontally while those of the other roller are permanently fixed, and these rollers are geared together at one end, so as to have rotation alike, but in contrary directions. The fixed roller has also a pulley upon its shaft, and motion is communicated to this one by means of an endless chain, *c*, passing over its pulley and around another pulley on the cane-mill. The rollers are made capable of being moved apart, in order that they may yield when passing thicker pieces of cane, or in case of excessive feeding, or if some should be presented crosswise, and by thus yielding the breaking of the chain or other part is prevented. The aperture is required to be kept closed, for the reason that if the furnace is supplied with air by an artificial blast a portion of the gases would escape at this aperture instead of passing, as all should, under the boilers. If a natural draft be depended upon, it is important that all the air admitted should be at or near the lower part. This closing may be effected by various methods. As represented, the boxes of one of the rollers O′ are set upon guide-pieces or slides, the ends of which project beyond the hopper, and against these ends strong feather-springs *s* act to force the boxes inward toward the stationary roller. The necessary play is thereby permitted, and the surface of the rollers being kept always as closely together as possible, those sieze the bagasse as it falls into the hopper from the carrier and deposit it in the furnace. This furnace is shown at B, and, as before remarked, it is a large chamber, covered at top, into which the necessary quantity of air to maintain combustion may be introduced through suitable grates at the bottom, although the construction which I prefer for the bottom is that of a tight or solid floor or hearth, as seen at *b*, the air being admitted by means either of draft-doors or of a channel, *g*, running around the sides of the furnace within the wall and near the said floor, from which channel a series of fine jets, as at *i*, is projected into the furnace either by a blast or by the natural draft of the chimney into which the products of combustion are finally delivered. A solid hearth has this advantage, that, as the bagasse contains much silicious matter, and as to burn it requires also a strong current of air, the ashes, which are very abundant, are apt to choke upon grate-bars and the silex to melt upon them, thus interfering with the continuity of the operation, which of course does not occur where the air is admitted at the sides.

The furnace shown has an ash-pit, *c*, covered by a trap-door, *d*, operated from the outside, and opposite to which is a raking-hole, *e*, to haul off the ashes and dirt from the hearth. At the side of the furnace, but not extending to its top, is an opening or flue, *f*, communicating with the fire-chamber under the boilers C, whence the gaseous products of combustion are conveyed into the chamney.

The operation is as follows: A fire of wood or other suitable material having been built upon the hearth *b*, and steam raised thereby, the cane-mill A may be set in motion, the cane being supplied to it in the usual manner. So soon as the cane has received the compression of the last pair of rollers the trash or bagasse is delivered upon the endless carrier *a*, by which it is conveyed to the top of the furnace B, where it is received by the feed apparatus and deposited within the furnace. The blast or supply of air is to be now so reduced that the bagasse shall accumulate until the furnace is full, and, the feed still continuing, the blast is thereafter to be so regulated as to maintain such intensity of combustion as will effect the consumption of the bagasse as fast as but no faster than it is received from the mill. This combustion will occur only throughout the lower part of the mass, and here it will be at a clear white heat, rendering it necessary that the walls of the furnace should be made thick and substantial in order to prevent, as far as possible, loss of heat by external radiation. The bagasse in the upper part of the furnace is rapidly prepared for this intense combustion by the reverberation of heat from the upper walls of the furnace, while the strata immediately above that actually being consumed receives from below sufficient heat to complete the drying of it. The moisture and the gaseous products of combustion pass through the flue *f*, which, it will be observed, is at the side of the furnace. In consequence of this position and of the feeding-aperture being kept close by the rollers, the combustion does not extend to the upper part of the mass, but is confined to the lower strata, whereby sufficient intensity can be attained to generate the amount of heat required to prepare the fresh bagasse and to be of service under the boilers. The ashes may be removed from time to time without stopping the work, and the furnace is thus maintained in full blast by the consumption only of the wet bagasse itself, which, being used in this way before any portions have become sour, affords its highest value as fuel. This will be found to be generally sufficient to run the mill, if not additional fuel may be thrown into the furnace.

I am aware that the bagasse had been previously conveyed away from the rollers upon an endless carrier and deposited near the doors of the fire-chamber under the boilers, into which it was to be thrown with other fuel by the attendants, and I am also aware that it had been proposed to have this carrier run through a hot-air chamber above the boilers, for the purpose of drying the bagasse, so that it might be employed alone as fuel, but the quantity of bagasse is so great that the time it could be allowed to remain in the drying-chamber would effect only such partial drying that it could not have been burned by itself in any furnace then known. Even these, however, had not been so combined with a furnace that the bagasse was automatically deposited in the furnace in the manner I have described; nor were any of those plans capable of being so operated that the bagasse was rendered useful as an article of fuel and destroyed as fast as delivered from the cane-mill, or that the furnace could be kept in continuous operation without supplying from time to time other fuel.

The furnace I have described may be varied in its construction in several ways without departing from the general principles thereof—as, for instance, a hollow perforated cone may be placed upon the center of the hearth and the air admitted through this; if then the discharge-opening were at the top of the furnace, there should be a feeding-aperture capable of being closed at each side, in order that the range of intense combustion should be through the mass, and a stratum on each side in a state of constant preparation.

What is claimed as the invention of the said ALFRED STILLMAN, and which it is desired to secure by Letters Patent of the United States, is—

1. The employment, in connection with the boilers or other vessels of a sugar-plantation which require heat, and with the mill for expressing the juice from the cane, of a furnace constructed substantially in the manner herein set forth, capable of burning wet bagasse without the aid of other fuel than the bagasse itself, and capable also of utilizing thereby said bagasse as a generator of heat for said vessels, as described.

2. Combining the cane-mill with a furnace constructed as herein described, by means of the endless carrier, in the manner and for the purposes substantially as described.

ELIZABETH ANN HARRIS,
*Late Elizabeth Ann Stillman, Administratrix, &c.*

Witnesses:
J. P. PIRSSON,
S. H. MAYNARD.